United States Patent
Sabol et al.

(10) Patent No.: US 10,482,009 B1
(45) Date of Patent: Nov. 19, 2019

(54) USE OF A LOGICAL-TO-LOGICAL TRANSLATION MAP AND A LOGICAL-TO-PHYSICAL TRANSLATION MAP TO ACCESS A DATA STORAGE DEVICE

(71) Applicant: Google Inc., Mountain View, CA (US)

(72) Inventors: Christopher John Sabol, San Jose, CA (US); Slava Pestov, Mountain View, CA (US); Thomas W. Craig, Palo Alto, CA (US); Manuel Enrique Benitez, Cupertino, CA (US); Monish Shah, Dublin, CA (US); Daniel A. Ehrenberg, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 262 days.

(21) Appl. No.: 13/840,800

(22) Filed: Mar. 15, 2013

(51) Int. Cl.
*G06F 12/02* (2006.01)
(52) U.S. Cl.
CPC ................................ *G06F 12/0246* (2013.01)
(58) Field of Classification Search
CPC ............. G06F 12/0246; G06F 12/1009; G06F 12/0292; G06F 2212/7201; G06F 3/061
See application file for complete search history.

(56) References Cited

U.S. PATENT DOCUMENTS

| 4,761,785 A * | 8/1988 | Clark et al. ................... 714/805 |
| 2005/0141312 A1* | 6/2005 | Sinclair et al. ............... 365/222 |
| 2006/0020744 A1* | 1/2006 | Sinclair et al. ............... 711/103 |
| 2006/0184718 A1* | 8/2006 | Sinclair et al. ............... 711/103 |
| 2007/0101095 A1* | 5/2007 | Gorobets ............ G06F 12/0246 711/203 |
| 2008/0155178 A1* | 6/2008 | Sinclair et al. ............... 711/103 |
| 2012/0072680 A1* | 3/2012 | Kimura ................. G06F 11/108 711/154 |
| 2013/0311746 A1* | 11/2013 | Raindel ............... G06F 12/0292 711/206 |
| 2014/0164676 A1 | 6/2014 | Borchers et al. |
| 2014/0164677 A1 | 6/2014 | Borchers et al. |

* cited by examiner

*Primary Examiner* — Ann J Lo
*Assistant Examiner* — Jane Wei
(74) *Attorney, Agent, or Firm* — Brake Hughes Bellermann LLP

(57) ABSTRACT

An apparatus includes a host device and a data storage device. The host device is configured to store a first translation map for converting a logical sector to a logical erase unit. The data storage device includes a plurality of flash memory devices and a memory controller operationally coupled with the flash memory devices, each of the flash memory devices being arranged into a plurality of erase units, each of the erase units having a plurality of pages for storing data. The memory controller is configured to receive a second translation map from the host device, the second translation map for converting a logical erase unit to a physical erase unit within the flash memory devices, and store the second translation map in a memory module on the data storage device.

17 Claims, 7 Drawing Sheets

Mapping logical EU/column to physical chip #, physical EU

| Logical Erase unit | Logical Column 0 | Logical Column 1 | Logical Column 2 | |
|---|---|---|---|---|
| LEU 0 | (0, 0) | (1, 0) | (2, 0) | ~EU stripe 0 |
| LEU 1 | (0, 1) | (2, 2) | (1, 3) | ~EU stripe 1 |
| LEU 2 | (2, 3) | (1, 2) | (0, 3) | ~EU stripe 2 |

(physical chip #, physical erase unit #)

Group 0
(Physical Chip #, Physical EU Number)

| Logical EU | Logical Column 0 | Logical Column 1 | Logical Column 2 |
|---|---|---|---|
| LEU 0 | (0,0) | (1,0) | (2,0) |
| LEU 1 | (0,1) | (2,2) | (1,3) |
| LEU 2 | (2,3) | (1,2) | (0,3) |

EU Stripe 0
EU Stripe 1
EU Stripe 2

Group 1
(Physical Chip #, Physical EU Number)

| Logical EU | Logical Column 0 | Logical Column 1 | Logical Column 2 |
|---|---|---|---|
| LEU 0 | (3,0) | (4,0) | (5,0) |
| LEU 1 | (3,1) | (4,1) | (5,2) |
| LEU 2 | (3,3) | (4,2) | (5,3) |

EU Stripe 3
EU Stripe 4
EU Stripe 5

USE OF A LOGICAL-TO-LOGICAL TRANSLATION MAP AND A LOGICAL-TO-PHYSICAL TRANSLATION MAP TO ACCESS A DATA STORAGE DEVICE

TECHNICAL FIELD

This description relates to use of a logical-to-logical translation map and a logical-to-physical translation map to access a data storage device.

BACKGROUND

Data storage devices may be used to store data. A data storage device may be used with a computing device to provide for the data storage needs of the computing device.

SUMMARY

A computing system includes a host computing device and a data storage device. The data storage device includes a memory controller and a plurality of memory devices (e.g., flash memory devices). According to an example implementation, two translation maps are provided to allow a mapping between logical resources and physical resources. First, a logical-to-logical translation map is provided and may be stored on the host computing device and/or on the data storage device. The logical-to-logical translation map may, for example, map (or may be used to translate or convert) between a logical sector and a logical erase unit, e.g., for a plurality of logical sectors. In one example implementation, the logical-to-logical map may map (or may be used to translate) between a logical sector and a logical erase unit, logical column and a physical page. Second, a logical-to-physical translation map may be provided in memory on data storage device. The logical-to-physical translation map may map (or may be used to translate) between a logical erase unit and a physical erase unit within the data storage device. For example, the logical-to-physical translation map may map between a logical erase unit, logical column and a physical chip and physical erase unit within the physical chip. One or both of the translation maps may be used to perform a number of operations, such as memory operations (e.g., read and write operations) on the data storage device, to improve a garbage collection process, and to perform data reconstruction for requested data that is either corrupted or busy based on a write operation, for example.

There may be one or more advantages to providing two translation maps in this manner, including a logical-to-logical translation map provided on the host computing device, and a logical-to-physical translation map provided on the data storage device. First, this two map arrangement may allow for the larger or more complicated logical-to-logical translation map, at least in one example implementation, to be provided on the host computing device which typically has more memory and more computing power, and a smaller, for example, logical-to-physical translation map to be provided on the data storage device. Second, this two map arrangement places the erase unit (EU) information of the logical-to-physical translation map on the data storage device where this information may be used by the memory controller to perform data reconstruction (or RAID reconstruction). Third, this two map arrangement provides information, such as one or more of the logical sector, logical erase unit and physical page information of the logical-to-logical translation map on the host computing device to allow a garbage collection control engine to more efficiently perform garbage collection.

According to one general aspect, an apparatus includes a host device configured to store a first translation map for converting a logical sector to a logical erase unit. A data storage device is provided that includes a plurality of flash memory devices and a memory controller operationally coupled with the flash memory devices, each of the flash memory devices being arranged into a plurality of erase units, each of the erase units having a plurality of pages for storing data. The memory controller is configured to receive a second translation map from the host device, the second translation map for converting a logical erase unit to a physical erase unit within the flash memory devices and store the second translation map in a memory module on the data storage device.

Implementations may include one or more of the following features. For example, the host device may be further configured to receive a memory read command from an application running on the host device, the memory read command identifying a logical sector, and convert the logical sector to a corresponding logical erase unit and a physical page based on the first translation map. The memory controller may be further configured to receive, from the host device, the memory read command, and an identification of the logical erase unit and the physical page, convert the logical erase unit to a corresponding physical erase unit based on the second translation map, perform a memory read operation on the flash memory devices based on the memory read command, the physical erase unit and the physical page, and return data of the memory read operation to the host device.

In another implementation, the host device is further configured to receive a memory write command from an application running on the host device, the memory command identifying a logical sector, and identify a free physical page of a new logical erase unit. The memory controller is further configured to receive, from the host device, the memory write command, and an identification of the free physical page and the new logical erase unit, convert the logical erase unit to a corresponding physical erase unit based on the second translation map, perform a memory write operation on the free physical page within the corresponding physical erase unit of the flash memory devices based on the memory write command, and return to the host device an acknowledgement of the write operation. The host device is further configured to update the first translation map so that the received logical sector corresponds to the new logical erase unit and the free physical page.

In another implementation, a data buffer is provided on the data storage device that is the same size as a physical page, wherein the memory controller is further configured to receive one or more write requests from the host device to write a plurality of logical sectors of data to the flash memory devices, write the logical sectors of to the data buffer, and write the data in the data buffer to a physical page corresponding to a free logical page when the data buffer becomes full.

In another implementation, a garbage collection control engine is provided on the host device and configured to control garbage collection on the data storage device. The memory controller is further configured to perform the following based on receiving one or more instructions from the garbage collection control engine: copy one or more valid logical sectors from a logical erase unit selected for garbage collection to a new logical erase unit, erase the erase unit selected for garbage collection, update the first translation map to reflect that the one or more valid logical sectors are now stored in the new logical erase unit.

In another implementation, the erase units are arranged into a plurality of erase unit stripes, each of the erase unit stripes includes an erase unit on a flash memory device for each of a plurality of logical columns.

In another implementation, the erase units are arranged into a plurality of erase unit stripes, each of the erase unit stripes includes an erase unit on a flash memory device for each of a plurality of logical columns, wherein parity information is stored in one erase unit of each erase unit stripe, and data are stored in a plurality of remaining erase units of each erase unit stripe.

In another implementation, the erase units are arranged into a plurality of erase unit stripes, each of the erase unit stripes comprising an erase unit on a flash memory device for each of a plurality of logical columns, wherein parity information is stored in one erase unit of each erase unit stripe, and data are stored in a plurality of remaining erase units of each erase unit stripe, wherein data of a first erase unit within a first erase unit stripe are reconstructed through an exclusive OR operation on corresponding data in the remaining erase units of the first erase unit stripe.

In another implementation, the erase units are arranged into a plurality of erase unit stripes, each of the erase unit stripes comprising an erase unit on a flash memory device for each of a plurality of logical columns, wherein parity information is stored in one erase unit of each erase unit stripe, and data are stored in a plurality of remaining erase units of each erase unit stripe, wherein data of a first erase unit, which is busy via a write operation, within a first erase unit stripe is reconstructed and at least a portion thereof is provided in response to a read memory request, the data being reconstructed through an exclusive OR operation on corresponding data in the remaining erase units of the first erase unit stripe.

In another implementation, the first translation map is for converting a logical sector to a logical erase unit, logical column and physical page.

In another implementation, the second translation map is for converting a logical erase unit and logical column to a physical chip and a physical erase unit within the physical chip.

According to another general aspect, a computer program product is provided. The computer program product includes a non-transitory computer-readable storage medium and storing executable code that, when executed by at least one data processing apparatus, is configured to cause the at least one data processing apparatus to perform a method including: store, by a host device, a first translation map for converting a logical sector to a logical erase unit and a physical page, receive, by a memory controller of a data storage device, a second translation map from the host device, the second translation map for converting a logical erase unit to a physical erase unit within the data storage device, wherein the data storage device includes a plurality of flash memory devices and the memory controller operationally coupled with the flash memory devices, each of the flash memory devices being arranged into a plurality of erase units, each of the erase units having a plurality of pages for storing data, and store, by the memory controller, the second translation map in a memory module on the data storage device.

Implementations may include one or more of the following features. For example, in one implementation, the method performed by the at least one data processing apparatus further includes performing the following by the host device: receive a memory read command from an application running on the host device, the memory read command identifying a logical sector, and convert the logical sector to a corresponding logical erase unit and a physical page based on the first translation map; and, performing the following by the memory controller: receive, from the host device, the memory read command, and an identification of the logical erase unit and the physical page, convert the logical erase unit to a corresponding physical erase unit based on the second translation map, perform a memory read operation on the flash memory devices based on the memory read command, the physical erase unit and the physical page, and return data of the memory read operation to the host device.

In another implementation, the method performed by the at least one data processing apparatus further includes: perform the following by the host device: receive a memory write command from an application running on the host device, the memory write command identifying a logical sector; and identify a free physical page of a new logical erase unit. The method may further include performing the following by the memory controller: receive, from the host device, the memory write command, and an identification of the free physical page and the new logical erase unit, convert the logical erase unit to a corresponding physical erase unit based on the second translation map, perform a memory write operation on the free physical page within the corresponding physical erase unit of the flash memory devices based on the memory write command, and return to the host device an acknowledgement of the write operation. The method may further include performing the following by the host device: update, by the host device, the first translation map so that the received logical sector corresponds to the new logical erase unit and the free physical page.

In another implementation, the data storage device further includes a write buffer that is the same size as a physical page, wherein the method performed by the at least one data processing apparatus further includes: performing the following by the memory controller:receive one or more write requests from the host device to write a plurality of logical sectors of data to the flash memory devices, write the logical sectors of to the write buffer, and write the data in the write buffer to a physical page corresponding to a free logical page when the write buffer becomes full.

In another implementation, the method performed by the at least one data processing apparatus further includes: performing the following by the memory controller:copy one or more valid logical sectors from a logical erase unit selected for garbage collection to a new logical erase unit, erase the erase unit selected for garbage collection, and update the first translation map to reflect that the one or more valid logical sectors are now stored in the new logical erase unit.

In another implementation, the erase units are arranged into a plurality of erase unit stripes, each of the erase unit stripes comprising an erase unit on a flash memory device for each of a plurality of logical columns, wherein parity information is stored in one erase unit of each erase unit stripe, and data are stored in a plurality of remaining erase units of each erase unit stripe, wherein the method performed by the at least one data processing apparatus further includes performing the following by the memory controller:reconstruct, by the memory controller, data of a first erase unit within a first erase unit stripe through an exclusive OR operation on corresponding data in the remaining erase units of the first erase unit stripe.

In another implementation, the erase units are arranged into a plurality of erase unit stripes, each of the erase unit stripes comprising an erase unit on a flash memory device for each of a plurality of logical columns, wherein parity information is stored in one erase unit of each erase unit stripe, and data are stored in a plurality of remaining erase units of each erase unit stripe, wherein the method performed by the at least one data processing apparatus further includes: performing the following by the memory controller: receive a read request from the host device for data that includes at least a portion of a first erase unit that is part of a first erase unit stripe, the first erase unit stripe including a plurality of erase units including the first erase unit stored on a first flash memory device, with one of the erase units of the erase unit stripe storing parity information and other erase units of the erase unit stripe storing data, determine that the first flash memory device is busy based on a write operation being performed on the first flash memory device, reconstruct data of the first erase unit stored on the first flash memory device through an exclusive OR operation performed on corresponding data in remaining erase units of the first erase unit stripe, and provide the requested data to the host device including at least a portion of the reconstructed data.

According to another general aspect a method is provided. The method may be performed by a system that includes a host device and a data storage device, the data storage device including a plurality of flash memory devices and a memory controller operationally coupled with the flash memory devices, each of the flash memory devices being arranged into a plurality of erase units, each of the erase units having a plurality of pages for storing data. The method may include storing, by the host device, a first translation map for converting a logical sector to a logical erase unit, receiving, by the memory controller, a second translation map from the host device, the second translation map for converting a logical erase unit to a physical erase unit within the flash memory devices, and storing the second translation map in a memory module on the data storage device.

According to another general aspect a system includes a host device and a data storage device, the data storage device including a plurality of flash memory devices and a memory controller operationally coupled with the flash memory devices, each of the flash memory devices being arranged into a plurality of erase units, each of the erase units having a plurality of pages for storing data. The system may include means for storing a first translation map for converting a logical sector to a logical erase unit, means for receiving, by the memory controller, a second translation map from the host device, the second translation map for converting a logical erase unit to a physical erase unit within the flash memory devices, and storing the second translation map in a memory module on the data storage device.

The details of one or more implementations are set forth in the accompanying drawings and the description below. Other features will be apparent from the description and drawings, and from the claims.

BRIEF DESCRIPTION OF THE DRAWINGS

FIG. 3 is a table 310 illustrating a mapping of logical erase unit and logical column to a corresponding physical chip and physical erase unit according to an example implementation.

FIG. 5 is a diagram 510 including tables 510A and 510B illustrating a mapping of a logical erase unit and a logical column to a corresponding physical chip and physical erase unit for a plurality of logical erase units, according to an example implementation.

DETAILED DESCRIPTION

This document describes systems and techniques relating to use of a logical-to-logical translation map and a logical-to-physical translation map to access a data storage device in conjunction with a host computing device. The data storage device may include a memory controller and multiple memory devices. The multiple memory devices may be any type of memory device, as discussed in more detail below, including multiple flash memory devices. The host computing device may include one or more applications that send memory operation commands, such as memory write commands and memory read commands, for execution by the memory controller of the data storage device.

According to an example implementation, two translation maps are provided to allow a mapping between logical resources and physical resources. First, a logical-to-logical translation map is provided and may be stored on the host computing device. Alternatively, the logical-to-logical translation map may be stored on the data storage device. Therefore, the logical-to-logical translation map may be stored on the host computing device, the data storage device, or both. The logical-to-logical translation map may, for example, map (or may be used to translate or convert) between a logical sector and a logical erase unit, e.g., for a plurality of logical sectors. In one example implementation, the logical-to-logical map may map (or may be used to translate) between a logical sector and a logical erase unit, logical column and a physical page. Second, a logical-to-physical translation map may be provided in memory on data storage device. The logical-to-physical translation map may map (or may be used to translate) between a logical erase unit and a physical erase unit within the data storage device. For example, the logical-to-physical translation map may map between a logical erase unit, logical column and a physical chip and physical erase unit within the physical chip. One or both of the translation maps may be used to perform a number of operations, such as memory operations (e.g., read and write operations) on the data storage device, to improve a garbage collection process, and to perform data reconstruction for requested data that is either corrupted or busy based on a write operation, for example.

Figure 1:
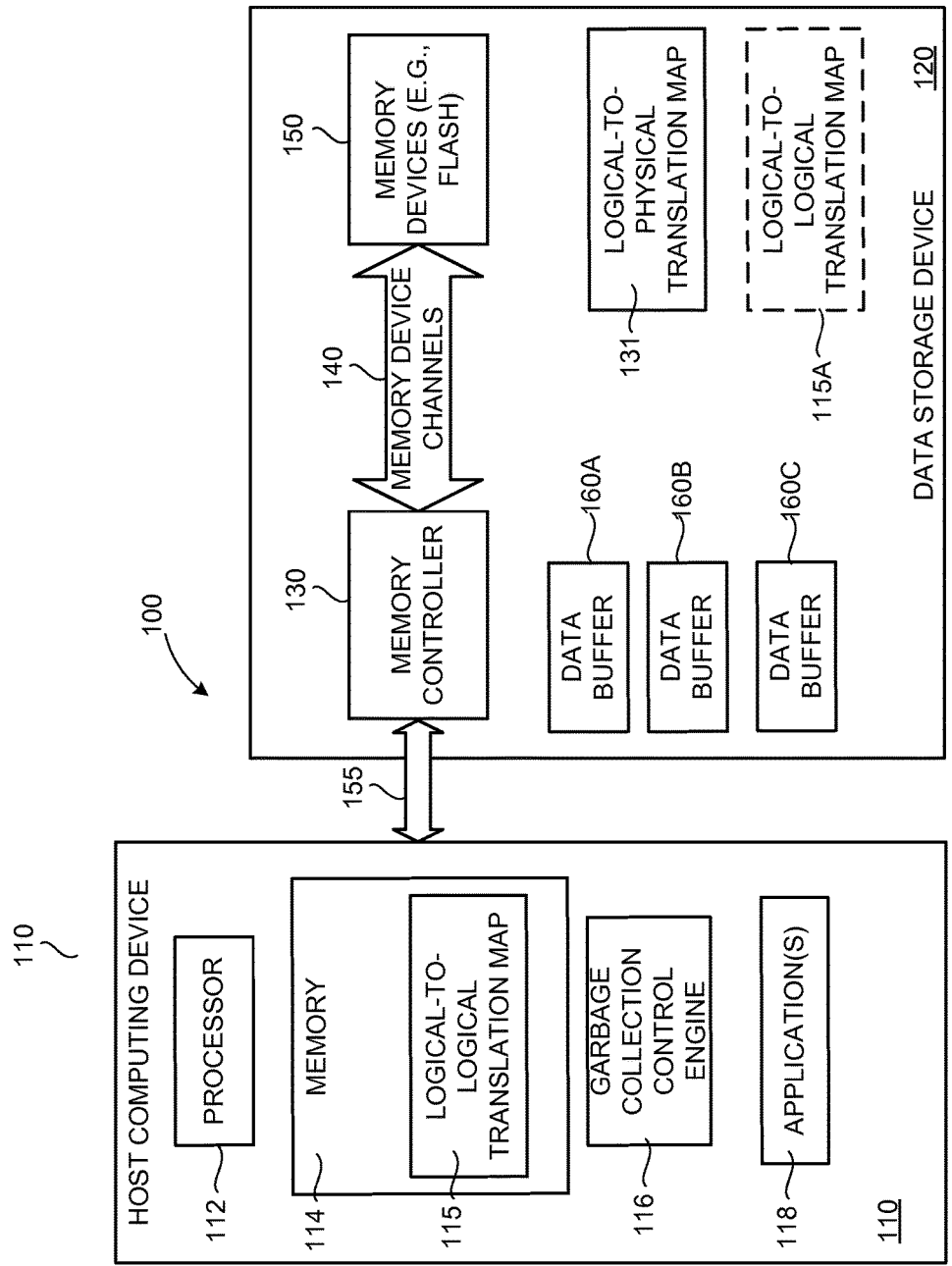
FIG. 1 is a block diagram illustrating a computing system 100 in accordance with an example implementation.

FIG. 1 is a block diagram illustrating a computing system 100 in accordance with an example implementation. The computing system 100 includes a host computing device 110 and a data storage device 120. The host computing device 110 and the data storage device 120 may be implemented using the techniques described herein. The host 110, in this example, may be an electronic device that is operably coupled with the data storage device 120, and may issue various types of commands and/or requests to the data storage device. The host 110 may take a number of forms. As some examples, the host 110 may be implemented as a personal computer, a laptop computer, a server, a tablet computer or a netbook computer. In other implementations, the host 110 may take other forms as well. The data storage device 120 also may take a number of forms. The data storage device 120 may be implemented as a number of appropriate devices that may work in conjunction with a host device (e.g., the host device 110) to store and/or retrieve electronic data. For instance, the data storage device may be a solid state drive (SSD) (e.g., a flash memory based SSD), a magnetic disk drive or an optical disk drive, as some examples.

The host computing device 110 includes a processor 112 for executing instructions or software, memory for storing data and instructions, a garbage collection control engine 116 for controlling garbage collection operations within computing system 100, and an application(s) 118, which may run or be executed by processor 112, for example.

As shown in FIG. 1, the data storage device 120 includes a memory controller 130, memory device channel interfaces 140 (also referred to as memory device channels) and memory devices 150. The data storage device 120 may also include one or more data buffers 160, such as data buffers 160A, 160B and 160C, although any number of data buffers. The data buffers 160A, 160B and 160C may, for example, be used to temporarily store or buffer data received from host computing device 110 prior to writing such buffered data to memory devices 150 of data storage device 120. The memory devices 150 may be implemented using a number of different types of memory devices. For instance, the memory devices 150 may be implemented using flash memory devices (e.g., NAND flash memory devices), or other types of non-volatile memory devices. In certain implementations, volatile memory devices, such as random access memory devices, may be used. For purposes of this disclosure, the various implementations described herein will be principally discussed as being implemented using flash memory devices. It will be appreciated, however, that other approaches are possible and other types of memory devices may be used to implement the implementations described herein.

In the computing system 100, as well as in other implementations described herein, the memory controller 130 may obtain or receive memory operation commands from the host computing device 110. When implementing the data storage device 120 using flash memory devices for the memory devices 150, the memory operation commands (or requests) obtained by the memory controller 130 from the host computing device 110 may include flash memory read commands, flash memory write commands and flash memory erase commands, as well as other types of flash memory commands (e.g., move commands and/or copy commands). For purposes of this disclosure, the terms memory operation command, memory operation, memory request and memory command may be used interchangeably to describe machine-readable instructions (e.g., from a host computing device to a data storage device) to execute one or more data storage or memory functions in a data storage device.

In the computing system 100, the memory devices 150 may include a plurality of memory devices, such as flash memory devices, that are organized into a plurality of memory channels. In such an approach, each of the memory channels may include one or more individual memory devices. Depending on the particular implementation, the individual memory devices of a given memory channel may be implemented in individual device packages, or alternatively, multiple memory devices of a given memory channel may be included in a single device package.

For instance, in an example implementation, the data storage device 120 may include multiple memory channels, where each memory channel includes multiple flash memory devices 150 that are implemented in multiple separate device packages (e.g., four flash memory devices per package). In such an approach, the memory controller 130 may communicate with the memory devices 150 of each memory channel using a separate memory device channel interface 140. Each memory device channel interface 140 may include a respective channel controller that is configured to facilitate communication between the memory devices 150 of the respective memory channel and the memory controller 130. For example, such channel controllers may be configured to manage a shared bus between the memory controller 130 and the memory devices 150 of a given memory channel, including communicating memory operation commands, chip select information, as well as managing communication of other data and control information between the memory controller 130 and the memory devices 150 over a corresponding memory device channel interface 140.

In one exemplary implementation, the memory controller 130 and other components may be disposed on a printed circuit board and the memory devices 150 may be disposed on one or more other printed circuit boards. The printed circuit boards may be assembled together.

In one exemplary implementation, a high speed link 155 may be used to connect the host computing device 110 and the data storage device 120. The link 155 may be a physical connector or it may be a logical connector. For instance, the link 155 may be a PCI-e link to connect and route signals between the host computing device 110 and the data storage device 120.

System 100 may perform many operations, including, but not limited to: 1) performing memory operations (e.g., read, write or erase operations) requested by host computing device 110 or application(s) 118 to memory devices 150 of data storage device 120; 2) garbage collection, e.g., under control of garbage collection control engine 116; and 3) performing data reconstruction (or redundant arrays of inexpensive disks/RAID reconstruction of data) for data that has become corrupted within data storage device 120.

An application 118 (or multiple applications) may be provided or running on the host computing device 110. Some applications may perform (or request) write operations to the data storage device 120 in logical sectors (which may also be referred to as logical blocks), which may be 512 bytes (512B), 4 kilobytes (4 KB), or other data chunk size. Application 118 may request a write operation to the data storage device 120 by, for example, issuing a memory write command to memory controller 130, and identify the logical sector to which the write operation should be performed. While the application 118 or host computing device 110 may perform write operations using a logical sector (e.g., by application 118 issuing memory write commands to memory controller 130 to write the 4 KB logical sector to the flash devices 150), the data storage device 120 may write data to the flash memory devices in chunks of data that are pages (e.g., 16 KB). In other words, according to an example implementation, the smallest chunk of data that can be written to the flash devices 150 of the data storage device 120 may be a page.

In one example implementation, a size of a page used by the data storage device 120 may be larger than the size of the logical sector used by the application 118. For example, an application 118 may write logical sectors (e.g., 4 KB logical sectors), while the memory controller 130 of the data storage device 120 may write 16 KB pages to the flash devices 150. The 4 KB size for a logical sector (or logical block), and the 16 KB page size are merely examples, and other sizes may be used. However, according to an example implementation, the logical sector size, used for memory operations by the application 118, may be smaller than the page size used for physical write operations by the data storage device 120.

Therefore, according to an example implementation, in order to accommodate this mis-match in data sizes between the logical sector used by application 118 and the pages (or write blocks) used by the data storage device 120 and to improve write efficiency, one or more data buffers 160 may be provided on the storage device, such as data buffers 160A, 160B, 160C. Alternatively, the data buffers 160 may be provided on the host computing device 110. According to an example implementation, each of the data buffers 160 may be the same size as the pages used by the storage device (e.g., 16 KB). One or more write requests or memory write commands may be received by the memory controller 130 of the data storage device 120 from the host computing device 110 and/or application 118 (or other applications) to write one or more 4 KB logical sectors to the data storage device 120.

According to one example implementation, a logical write operation may be performed by the memory controller 130 in response to receiving the logical block write request, including writing (or storing) the 4 KB logical block to one of the data buffers 160, and then acknowledging (or sending an acknowledgement) back to the host computing device 110 or application 118 that the write operation was completed. This logical write operation, including writing the logical block to a data buffer 160 and providing a write acknowledgement to the host computing device 110, may be repeated one or more times until a data buffer is full. Thus, for example, when four 4 KB logical blocks have been logically written (e.g., write request received and acknowledged and logical block stored in a data buffer 160), the data (e.g., 16 KB) of this full data buffer 160 may then be physically written by the memory controller 130 as a page to a (e.g., 16 KB) free page within the data storage device 120.

Therefore, according to an example implementation, memory controller 130 may receive one or more write requests from the host computing device 110 to write a plurality of logical sectors of data to the flash memory devices 150. Memory controller 130 then writes the logical sectors of data to the data buffer 160. Memory controller 130 then writes the data in the data buffer 160 to a physical page corresponding to a free logical page when the data buffer 160 becomes full.

System 100 may perform many operations, including, for example: 1) performing memory operations (e.g., read, write or erase operations) requested by host computing device 110 or application(s) 118 to memory devices 150; 2) garbage collection; and 3) performing data (or redundant arrays of inexpensive disks/RAID) reconstruction of data that has become corrupted within data storage device 120.

The garbage collection control engine 116 can be used to coordinate and control garbage collection operations on the data storage device 120. Garbage collection control engine 116 may include logic, or may be a software program that runs or executes on host computing device 110 or processor 112. Alternatively, although not shown in FIG. 1, garbage collection control engine 116 may be a program that runs on memory controller 130, for example. Cells of memory devices 150 are organized in erase units (or erase blocks) and each erase unit includes a plurality of pages. Each page may include a plurality of logical sectors (or logical blocks), for example. Data can be written to and read from a memory device 150 in page-sized units, but when data is erased from a memory device 250, it is to be erased in erase units. In addition, memory devices 150 cannot be updated in-place, that is, data written to a page of a chip cannot be overwritten by new data. Because of these constraints, when updating of data on the data storage device 120 an out-of-place updating scheme must be used in which the new data are written to a different physical location than the old data, and then the old data are declared invalid.

According to an example implementation, logical sectors (or logical blocks) of memory devices 150 can have one of three states: (1) free (wherein the logical sector contains no data and is available to store new or updated data); (2) valid (wherein the logical sector contains new or recently updated data that is available to be read); or (3) invalid (wherein the logical sector contains obsolete data or data marked for deletion/erase). After some cycles of updating data on a memory device 150 using the out-of-place updating procedure, the number of valid and invalid logical blocks will increase, which reduces the number of free logical blocks available to receive new or updated data.

Therefore, a garbage collection process is used to reclaim logical sectors or pages on a memory device. The garbage collection process eliminates the need to perform erasure of the whole erase unit prior to every page write. The garbage collection process accumulates pages, logical sectors (or other chunks of memory) marked as invalid (or marked for erase) as "garbage" and performs an erasure of an entire erase unit as space reclamation in order to reuse the erase unit.

According to an example implementation, garbage collection control engine 116 performs and/or controls the garbage collection process for data storage device 120. In a garbage collection process, an erase unit is targeted for having all of its data erased, so that the logical sectors or pages of the erase unit can be reclaimed. Before erasing the selected erase unit, the valid logical sectors of the erase unit that has been targeted or selected for garbage collection are copied to a new location into free pages of one or more different erase units or one or more different memory devices. After all the valid logical sectors of the targeted erase unit are successfully copied to the new locations, the logical sectors of the selected or targeted erase unit are erased, so that they are free to have data written to them.

According to an example implementation, two translation maps are provided to allow a mapping between logical resources and physical resources. First, a logical-to-logical translation map 115 is provided and may be stored in memory 114 on the host computing device 110. Alternatively (or as an additional copy of the map 115), the logical-to-logical translation map 115A may be stored on the data storage device 120. The logical-to-logical translation map 115 may, for example, map (or may be used to translate or convert) between a logical sector and a logical erase unit, e.g., for a plurality of logical sectors. In one example implementation, the logical-to-logical map 115 may map (or may be used to translate) between a logical sector and a logical erase unit, logical column and a physical page. Second, a logical-to-physical translation map 131 may be provided in memory (e.g., within DRAM) on data storage device 120. Logical-to-physical translation map 131 may map (or may be used to translate) between a logical erase unit and a physical erase unit within the data storage device 120. For example, logical-to-physical translation map 131 may map between a logical erase unit, logical column and a physical chip and physical erase unit within the physical chip.

There may be one or more advantages to providing two translation maps in this manner, including a logical-to-logical translation map 115 provided on the host computing device 110, and a logical-to-physical translation map 131 provided on the data storage device 120. First, this two map (or two table) arrangement allows the larger more complicated logical-to-logical translation map 115 to be provided on the host computing device 120 which has more memory and more computing power, and a smaller, for example, logical-to-physical translation map 131 to be provided on the data storage device 120 where memory may typically be more limited and computing power of the memory controller 130 may be significantly less than processor 112.

Second, this two map arrangement places the erase unit information of the logical-to-physical translation map 131 on the data storage device 120 where this information may be used by memory controller 130 to perform data reconstruction (or RAID reconstruction). For example, the logical-to-physical translation map 131 may allow the memory controller 130 of data storage device 120 to identify which erase units are part of each erase unit stripe, so that when an erase unit is corrupted or busy, this erase unit may be reconstructed based on the remaining erase units of the erase unit stripe, e.g., based on an exclusive OR (XOR) operation of corresponding data bits of the remaining erase units of the erase unit stripe. Also, the memory controller 130 may replace bad erase units with a free erase unit based on the logical-to-physical translation map 131. For example, when a bad erase unit is discovered, the garbage collection engine 116 may notify the memory controller 130 of a new (or free) physical erase unit to be used in its place. The memory controller 130 then updates the logical-to-physical translation map 131 to replace the bad physical erase unit with the new physical erase unit, which will replace the bad erase unit. The bad erase unit will no longer appear in the logical-to-physical translation map 131. Thus, in this manner, the bad erase unit will no longer be used to store information.

Third, this two map arrangement provides the logical sector, logical erase unit and physical page (e.g., which may be a page offset within an erase unit) information of the logical-to-logical translation map 115 on the host computing device to allow garbage collection control engine 116 to more efficiently perform garbage collection. For example, garbage collection control engine 116, which may be in communication with application(s) 118 and may have access to logical-to-logical translation map 115, may store logical sectors or logical blocks or pages of an application together in memory, e.g., in a contiguous block of memory, for example. For example, during garbage collection, by knowing which logical sectors are associated with which applications, logical sectors for an application may be written to a same page, a same erase unit, or to a set of consecutive pages within an erase unit, for example, e.g., during garbage collection. Or, data or logical sectors for each application may be stored or kept within one erase unit, e.g., during garbage collection, thereby keeping data for each application together. In this manner, data for each application may be stored in its respective (or even a different) erase unit.

Thus, according to an example implementation, by grouping application data together for each application (or one or more applications), the garbage collection process may be more efficient by allowing all (or at least a portion) of this application data to be marked invalid and then erased together when the application data is updated, e.g., rendering the current application data invalid. This may decrease, for example, the situations where invalid logical sectors for an application may be scattered throughout different portions of an erase unit, or even on different erase units, which may cause a significant burden in moving remaining valid logical blocks to a new erase unit during garbage collection to allow the erase unit to be erased. Therefore, in this manner, by coupling the logical-to-logical translation map 115 to the application(s) 118 and garbage collection control engine 116 on the host computing device 110, it may be possible for the garbage collection process to be performed in a more efficient manner, at least in some cases.

According to an example implementation, a host computing device 110 may be configured to store a logical-to-logical translation map 115 for converting a logical sector to a logical erase unit. Alternatively, the logical-to-logical translation map 115A may stored on the data storage device 120. In one example implementation, the logical-to-logical translation map 115 is for converting a logical sector to a logical erase unit, logical column and physical page. Also, a data storage device 120 includes a plurality of flash memory devices 150 and a memory controller 130 operationally coupled with the flash memory devices 150. Each of the flash memory devices 150 are arranged into a plurality of erase units, each of the erase units having a plurality of pages for storing data. The memory controller 130 is configured to receive a logical-to-physical translation map 131 from the host computing device 110. The logical-to-physical translation map 131 is provided for converting a logical erase unit to a physical erase unit within the flash memory devices. In one example implementation, the logical-to-physical translation map 131 is for converting a logical erase unit and logical column to a physical chip and a physical erase unit within the physical chip. The memory controller 130 is also configured to receive (from the host computing device) and store the logical-to-physical translation map 131 in a memory module on the data storage device 120.

One or more of the translation maps 115 and 131 may be useful for garbage collection. Some example operations related to garbage collection will be briefly described. The garbage collection control engine 116 running on the host computing device 110 and is configured to control garbage collection on the data storage device 120. According to an example implementation, the memory controller 130 performs the following based on receiving one or more instructions from the garbage collection control engine 116: copy one or more valid logical sectors from a logical erase unit selected for garbage collection to a new logical erase unit, erase the erase unit selected for garbage collection, update the logical-to-logical translation map 115 to reflect that the one or more valid logical sectors are now stored in the new logical erase unit.

The two translation maps 115 and 131 may be used to perform memory operations, such as read and write operations, on the data storage device 120.

An example of a read operation will now be described. In this example, to initiate a read operation, a memory read command is received by the host computing device 110 from an application 118 running on the host computing device. According to an example implementation, the memory read command may identify a logical sector, e.g., a logical sector to which data should be written. The host computing device 110 converts the logical sector to a corresponding logical erase unit and a physical page (which may be a page offset within the erase unit) based on the logical-to-logical translation map 115. The memory controller 130 receives, from the host computing device 110, the memory read command, and an identification of the logical erase unit and the physical page. Memory controller 130 converts the logical erase unit to a corresponding physical erase unit based on the logical-to-physical translation map 131. Memory controller 130 then performs a memory read operation on the flash memory devices 150 based on the memory read command, the physical erase unit and the physical page, and returns data of the memory read operation to the host computing device 110.

An example of a write operation will now be described. The host computing device 110 receives a memory write command from an application 118 running on the host computing device 110. The memory command may identify a logical sector, for example. The host computing device 110 may identify a free physical page of a new logical erase unit. The memory controller 130 may receive, from the host computing device 110, the memory write command, and an identification of the free physical page and the new logical erase unit, and may convert the logical erase unit to a corresponding physical erase unit based on the second translation map. The memory controller may also perform a memory write operation on the free physical page within the corresponding physical erase unit of the flash memory devices 150 based on the memory write command, and return to the host computing device an acknowledgement of the write operation. In addition, the host computing may also update the logical-to-logical translation map 115 so that the received logical sector corresponds to the new logical erase unit and the free physical page.

Figure 2:
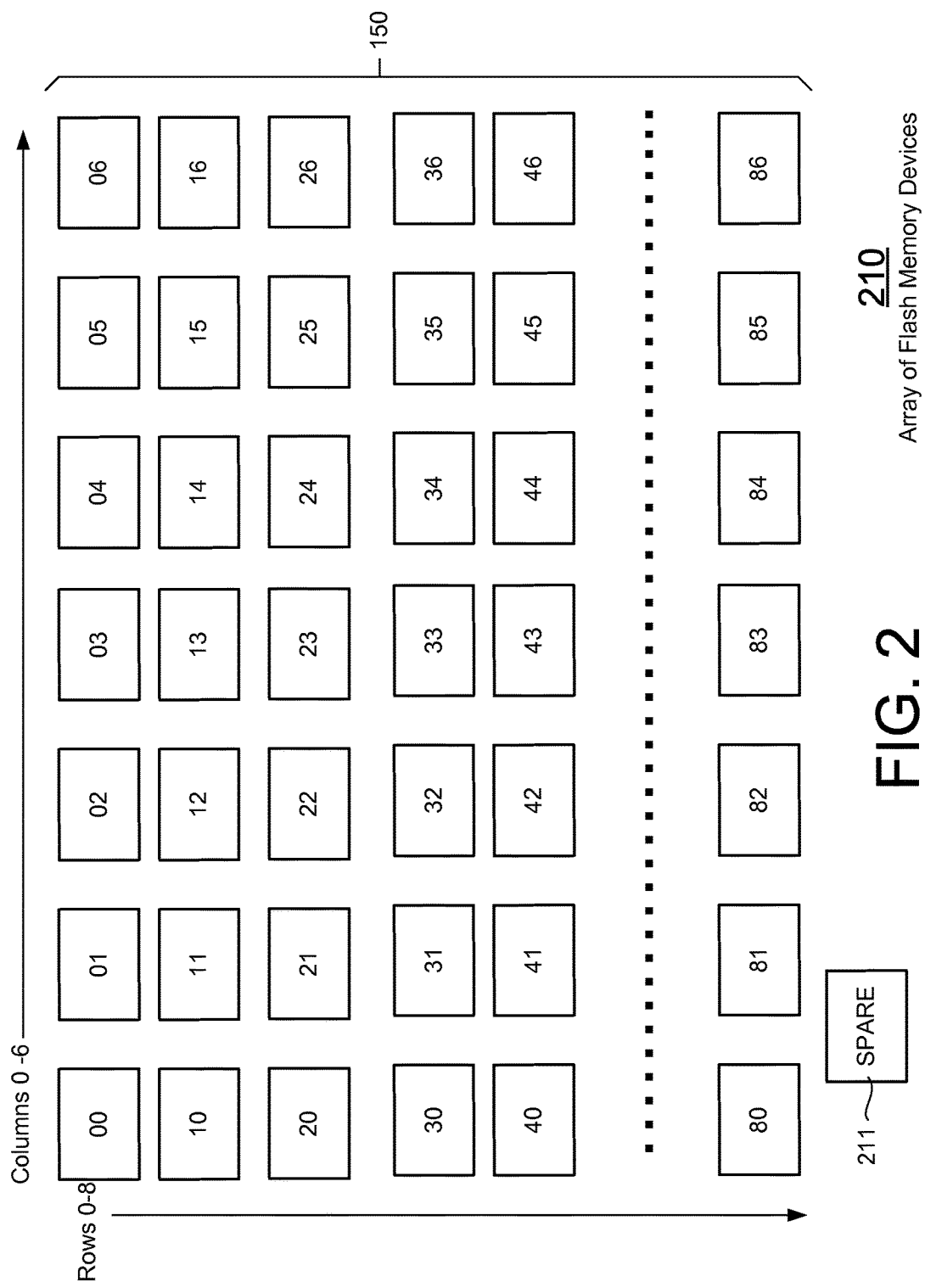
FIG. 2 is a diagram illustrating an array of flash memory devices 150 according to an example implementation.

FIG. 2 is a diagram illustrating an array of flash memory devices 150 according to an example implementation. The array 210 of flash memory devices 150 shown in FIG. 2 includes rows and columns of devices. In this illustrative example, the array 210 includes seven columns (columns 0-7) and nine rows (rows 0-8) of devices, to provide a total of 63 devices or chips, for example. One or more spare devices may be included, such as spare device 211, for example. Thus, in this illustrative example, there are 64 flash devices. Each device in array 210 is identified by a number that indicates a row and a column within array 210 where the device is located. For example, device 00 corresponds to the device located at row 0, column 0; device 04 corresponds to the device located at row 0, column 4; device 86 corresponds to the device located at row 8, column 6, etc.

In this illustrative example shown in FIG. 2, a memory array may include 64 chips, including 63 operating or active chips and one spare chip, a stripe width of 9 columns, 7 rows, a number of physical erase units per chip=4232, and a number of spare chips=(#chips−stripe width*number of groups)=1 spare chip. In the example shown in FIG. 2, the use of 9 rows and 7 columns, and the other illustrative details or numbers, are merely one example array size, and other quantities of devices and/or other sizes of memory arrays and other parameters may be used. As noted, each of the flash memory devices may include a plurality of erase units, with each erase unit including a plurality of pages, and each page including a plurality of logical sectors (or logical blocks).

FIG. 3 is a table 310 illustrating a mapping of logical erase unit and logical column to a corresponding physical chip (or chip number) and physical erase unit (or physical erase unit number) according to an example implementation. Table 310 includes three logical erase units (LEUs) including LEU 0, LEU 1, and LEU 2. Three logical columns are shown, including logical column 0, logical column 1 and logical column 2, where a logical column is a logical representation of a chip, for example. For each logical erase unit (LEU) and logical column combination, a corresponding physical chip and physical erase unit is identified by table 310. Also, the physical chip and physical erase unit combinations are identified for each of a plurality of erase unit stripes.

An erase unit (EU) stripe may include, for example, one erase unit for each of the logical columns. Within an EU stripe, one of the erase units includes parity information (e.g., generated as an XOR of data from the other erase units), and the remaining erase units of the EU stripe include data. When one of the erase units of an EU stripe becomes corrupted or is busy (via a write operation or other memory operation), the corrupted or busy erase unit may be regenerated or reconstructed by performing an exclusive OR (XOR) operation on corresponding bits of the remaining erase units of the stripe.

The information or mapping provided by table 310 of FIG. 3 may be an illustrative example of a logical-to-physical translation map 131, for example. For example, as shown in FIG. 3, erase unit (EU) stripe 0 may be associated with logical erase unit (LEU) 0, with logical column 0 and LEU 0 corresponding to (physical chip 0, physical erase unit 0); logical column 1 and LEU 0 corresponding to (physical chip 1, physical erase unit 0); and, logical column 2 and LEU 0 corresponding to (physical chip 2, physical erase unit 0). Similarly, for EU stripe 1, LEU 1 and logical column 0 corresponds to physical chip 0, physical erase unit 1; LEU 1 and logical column 1 corresponds to physical chip 2 and physical erase unit 2; and LEU 1 and logical column 2 correspond to physical chip 1 and physical erase unit 3. Other information is also shown in table 310, including the physical chips and physical erase units for EU stripe 2, which may correspond to LEU 2 in this example. Although in general, an EU stripe may not necessarily be associated with one logical erase unit, but could be provided across multiple logical erase units.

Figure 4:
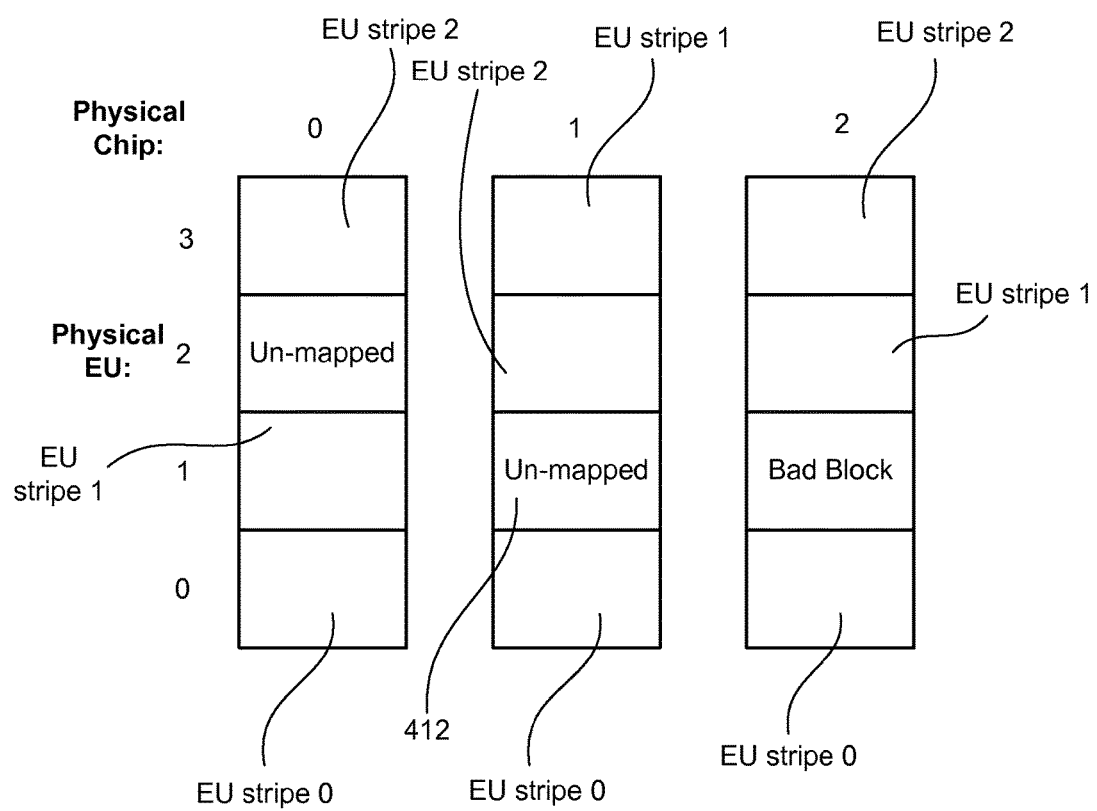
FIG. 4 is a table 410 illustrating a mapping of physical erase units and physical chips for each erase unit stripe according to an example implementation.

FIG. 4 is a table 410 illustrating a mapping of physical erase units and physical chips for each erase unit stripe according to an example implementation. Erase unit (EU) stripe 0 includes physical erase unit (EU) 0 of physical chip 0, physical EU 0 of chip 1, and physical EU 0 of chip 2. Also, EU stripe 1 includes physical EU 1 of physical chip 0, physical EU 3 of physical chip 1, and physical EU 2 of physical chip 2. Similarly, EU stripe 2 includes physical EU 3 of physical chip 0, physical EU 2 of physical chip 1, and physical EU 3 of physical chip 2. Two un-mapped physical EUs are shown, which may be free to be assigned to an EU stripe, e.g., in the event that a currently assigned physical EU goes bad or becomes corrupt. For example, within EU stripe 1, if physical EU 3 of physical chip 1 goes bad or needs to be replaced, the unmapped physical EU 412, for example, within the same physical chip 1 may replace the detected bad block, and the logical-to-physical translation map 131 may be updated to replace the physical EU3/physical chip 1 in the map 131 with the physical EU 1/physical chip 1.

The tables of FIGS. 3 and 4 are provided for an example memory array or example data storage device 120 that includes 3 physical chips, with no spare chips, where each physical chip has 4 physical erase units (EUs), and where there are 3 virtual erase units (EUs), and where the EU stripe width is 3 erase units or 3 columns (one EU per column or chip). If one or two more chips are added, making the total 4 or 5 chips, then the new chips could be used as spares, for example, but the logical space would not necessarily expand in this example. If, however, 3 more chips are added to provide 6 chips total, then a second group (or chip stripe) may be added, where a group (or chip stripe) includes 3 EU stripes.

Figure 6:
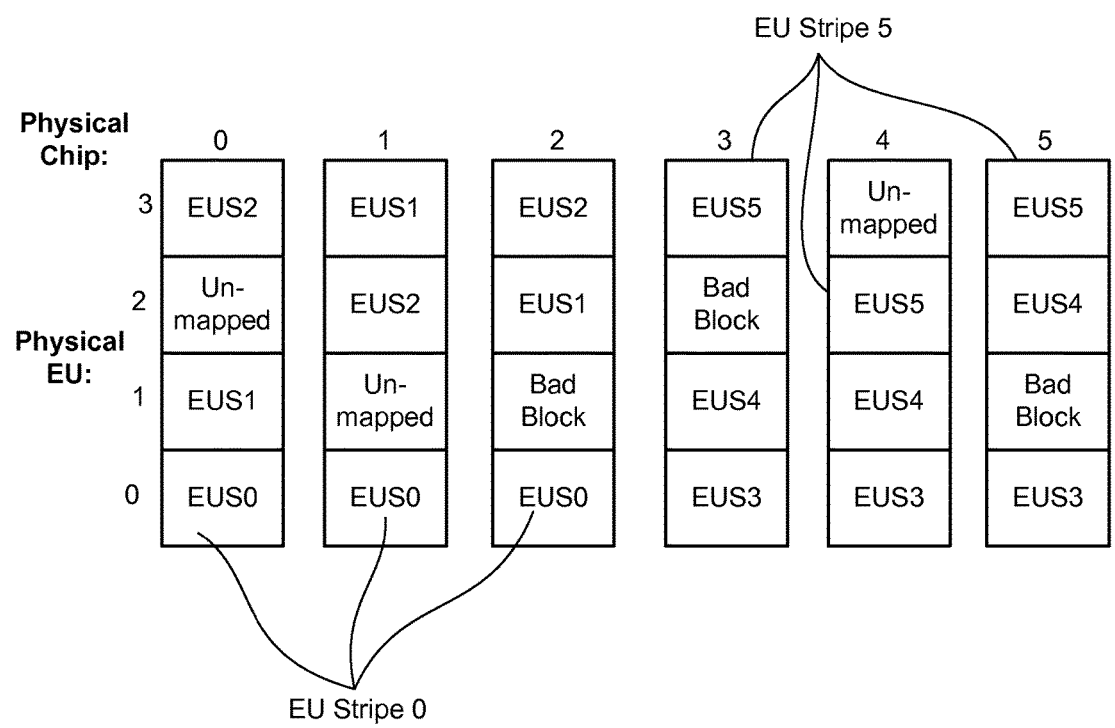
FIG. 6 is a diagram illustrating the physical chip and physical erase unit (EU) for each erase unit stripe according to an example implementation.

FIGS. 5 and 6 are diagrams provided for a memory array that includes, for example, six chips, and two groups (or two chip stripes), where each chip stripe includes three erase unit (EU) stripes. As noted, each erase unit (EU) stripe includes an erase unit on each of three logical columns or chips. FIG. 5 is a diagram 510 including tables 510A and 510B illustrating a mapping of a logical erase unit (logical EU) and a logical column to a corresponding physical chip and physical erase unit for a plurality of Logical EUs, according to an example implementation. Table 510A is provided for group 1 (or a first chip stripe), and table 510B is provided for group 2 (or a second chip stripe).

For group 0, as shown in table 510A, EU stripe 0 includes: 1) logical erase unit (LEU) 0, logical column 0 which corresponds to (physical chip 0, physical EU 0); 2) LEU 0, logical column 1 which corresponds to (physical chip 1, physical EU 0); and 3) LEU 0, logical column 2 which corresponds to (physical chip 2, physical EU 0). EU stripe 1 includes 1) LEU 1, logical column 0 which corresponds to (physical chip 0, physical EU 1); 2) LEU 1, logical column 1 which corresponds to (physical chip 2, physical EU 2); and 3) LEU 1, logical column 2 which corresponds to (physical chip 0, physical EU 3). And, EU stripe 2 includes 1) LEU 2, logical column 0 which corresponds to (physical chip 2, physical EU 3); LEU 2, logical column 1 which corresponds to (physical chip 1, physical EU 2); and, LEU 2, logical column 2 which corresponds to (physical chip 0, physical EU 3).

Similarly, table 510B identifies the logical erase units (LEUs) for EU stripes 3-5, including the physical chip and physical EU for each LEU/logical column combination.

FIG. 6 is a diagram illustrating the physical chip and physical erase unit (EU) for each erase unit stripe (e.g., EU stripes 0-5) according to an example implementation. The diagram illustrated in FIG. 6 corresponds to the information shown in tables 510A and 510B shown in FIG. 5. As shown in FIG. 6, erase unit (EU) stripe 0 includes to the following erase units: physical EU 0 on physical chip 0, physical EU 0 on physical chip 1, and physical EU 0 on chip 2. Erase unit stripe 5 includes physical EU 3 on physical chip 3, physical EU 2 on physical chip 4, and physical EU 3 on physical chip 5. The physical EUs are similarly identified in FIG. 6 for the other erase unit stripes.

For each erase unit stripe, one of the erase units includes parity information, and the remaining erase units of the erase unit stripe may include data. Parity information may be generated, for example, by performing an exclusive OR (XOR) operation on corresponding data bits of the other erase units within the erase unit stripe. For example, if EU stripe 1 includes EU1, EU2 and EU3. Then, data may be stored in EU1 and EU2, and parity information may be stored in EU3. Three erase units per EU stripe is merely one example, and other sized EU stripes may be used.

According to an example implementation, the erase units may be arranged into a plurality of erase unit (EU) stripes, each of the erase unit stripes including an erase unit on a flash memory device for each of a plurality of logical columns. In addition, parity information may be stored in one erase unit of each erase unit stripe, and data may be stored in a plurality of remaining erase units of each erase unit stripe.

According to one example implementation, erase units are arranged into a plurality of erase unit stripes, each of the erase unit stripes include an erase unit on a flash memory device for each of a plurality of logical columns. Parity information is stored in one erase unit of each erase unit stripe, and data are stored in a plurality of remaining erase units of each erase unit stripe. In one example implementation, data of a first erase unit within a first erase unit stripe are reconstructed through an exclusive OR operation on corresponding data of the remaining erase units of the first erase unit stripe. For example, data of an erase unit may need to be reconstructed if the erase unit becomes defective or corrupted.

Write operations may take much longer than a read operation. Therefore, according to another example implementation, memory controller 130 may receive a read command or a read request from host computing device 110 to read and provide one or more chunks of data, e.g., a read request to provide a logical sector, a page or an erase unit of data within an erase unit. In some cases, a write operation may be in the process of being performed when the read request is received for the same, or an overlapping data, or where the read operation and write operation may involve the same page. Rather than waiting for the write operation to complete, which may be a significant amount of time, the memory controller 130 may reconstruct the requested data by performing an XOR operation on the other erase units within the same EU stripe.

For example, a read command is received requesting a logical sector(s) of data within erase unit 1, and erase units 1, 2 and 3 are part of EU stripe 1. In this example, at the time of (or shortly after) receipt of the read request/command, the memory controller may determine that erase unit 1 is busy due to a write operation being performed on the erase unit 1. To provide the requested data for the read operation, the old data for erase unit 1 may be reconstructed by performing an XOR operation of corresponding bits of erase units 2 and 3. The requested portion (e.g., logical sectors) of the reconstructed erase unit 1 is then provided or returned to the host computing device 110, for example. In this manner, response time for a read operation may be improved in the case where there is a conflicting write operation, since the requested data may be reconstructed from remaining erase units of the erase unit stripe, rather than waiting for the write operation to complete.

Therefore, according to an example implementation, the erase units are arranged into a plurality of erase unit stripes, each of the erase unit stripes includes an erase unit on a flash memory device for each of a plurality of logical columns. Parity information is stored in one erase unit of each erase unit stripe, and data are stored in a plurality of remaining erase units of each erase unit stripe. In this example, a portion of data of a first erase unit, or a chip storing the requested data, may be busy due to a write operation that is being performed on the chip that stores the requested data. Since that chip is busy due to the write operation, the erase unit that includes the requested data may be reconstructed based on remaining erase units of the erase unit stripe and at least the requested portion of the reconstructed erase unit is then provided to the application 118 or host computing device 110 in response to a read memory request. Data from other erase units may be used to reconstruct the busy erase unit since the different erase units are stored on different physical chips. For example, the data may be reconstructed through an exclusive OR operation on corresponding data in the remaining (e.g., non-busy) erase units of the first erase unit stripe.

Figure 7:
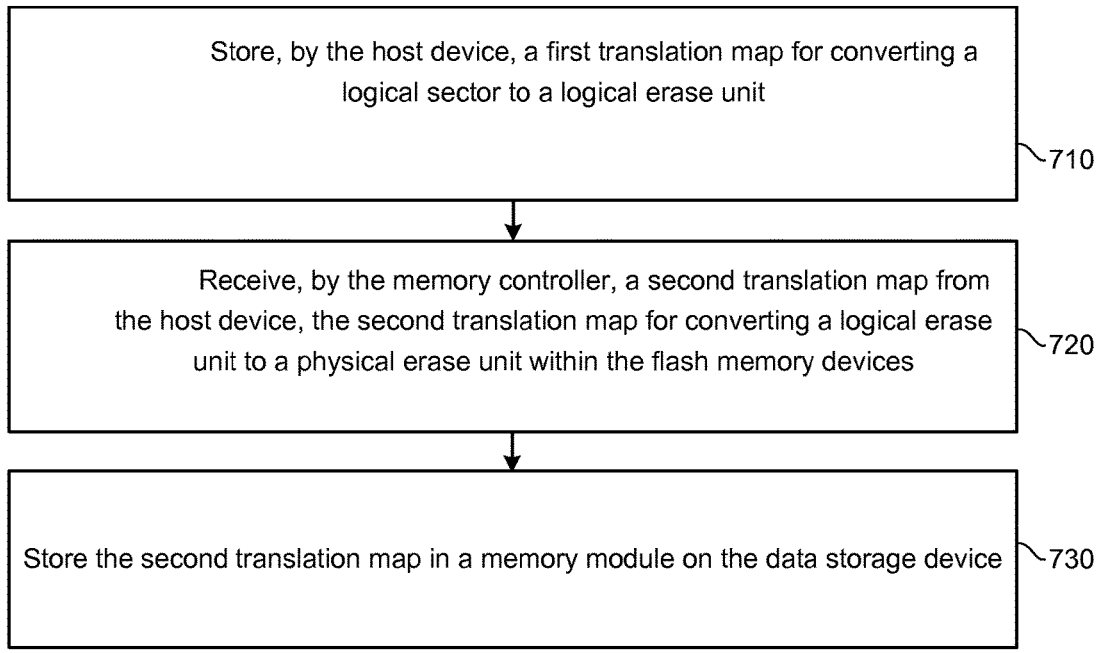
FIG. 7 is an exemplary flow diagram illustrating a process according to an example implementation.

FIG. 7 is an exemplary flow diagram illustrating an exemplary process 700 according to an example implementation. In one example implementation, a system may perform the process 700 of FIG. 7. The system, for example, may include a host device and a data storage device, the data storage device including a plurality of flash memory devices and a memory controller operationally coupled with the flash memory devices, each of the flash memory devices being arranged into a plurality of erase units, each of the erase units having a plurality of pages for storing dat. The process may include operations 710, 720 and 730, for example. At operation 710, the host device stores a first translation map for converting a logical sector to a logical erase unit. At operation 720, the memory controller receives a second translation map from the host device, the second translation map for converting a logical erase unit to a physical erase unit within the flash memory devices. At operation 730, the second translation map is stored in a memory module on the data storage device.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations.

What is claimed is:

1. An apparatus, comprising:
a host device configured to:
store a first translation map for converting a logical sector to a logical erase unit, logical column and physical page;
a data storage device including a plurality of flash memory devices and a memory controller operationally coupled with the flash memory devices, each of the flash memory devices being arranged into a plurality of erase units, each of the erase units having a plurality of physical pages for storing data;
and
wherein the memory controller is configured to:
receive a second translation map from the host device, the second translation map for converting a logical erase unit and logical columns to a physical chip and a physical erase unit within the physical chip;
store the second translation map in a memory module on the data storage device.

2. The apparatus of claim 1 wherein the host device is further configured to:
receive a memory read command from an application running on the host device, the memory read command identifying a logical sector;
convert the logical sector to a corresponding logical erase unit and a physical page based on the first translation map;
the memory controller is further configured to:
receive, from the host device, the memory read command, and an identification of the logical erase unit and the physical page;
convert the logical erase unit to a corresponding physical erase unit based on the second translation map;
perform a memory read operation on the flash memory devices based on the memory read command, the physical erase unit and the physical page; and
return data of the memory read operation to the host device.

3. The apparatus of claim 1 wherein the host device is further configured to:
  receive a memory write command from an application running on the host device, the memory command identifying a logical sector; and
  identify a free physical page of a new logical erase unit; the memory controller is further configured to:
  receive, from the host device, the memory write command, and an identification of the free physical page and the new logical erase unit;
  convert the logical erase unit to a corresponding physical erase unit based on the second translation map;
  perform a memory write operation on the free physical page within the corresponding physical erase unit of the flash memory devices based on the memory write command; and
  return to the host device an acknowledgement of the write operation; and
  wherein the host device is further configured to update the first translation map so that the received logical sector corresponds to the new logical erase unit and the free physical page.

4. The apparatus of claim 1 and further comprising a data buffer on the data storage device that is the same size as a physical page, wherein the memory controller is further configured to perform the following:
  receive one or more write requests from the host device to write a plurality of logical sectors of data to the flash memory devices;
  write the logical sectors to the data buffer; and
  write the data in the data buffer to a physical page corresponding to a free logical page when the data buffer becomes full.

5. The apparatus of claim 1 and further comprising a garbage collection control engine running on the host device and configured to control garbage collection on the data storage device;
  the memory controller further configured to perform the following based on receiving one or more instructions from the garbage collection control engine:
  copy one or more valid logical sectors from a logical erase unit selected for garbage collection to a new logical erase unit;
  erase the erase unit selected for garbage collection;
  update the first translation map to reflect that the one or more valid logical sectors are now stored in the new logical erase unit.

6. The apparatus of claim 1 wherein the erase units are arranged into a plurality of erase unit stripes, each of the erase unit stripes comprising an erase unit on a flash memory device for each of a plurality of logical columns.

7. The apparatus of claim 1 wherein the erase units are arranged into a plurality of erase unit stripes, each of the erase unit stripes comprising an erase unit on a flash memory device for each of a plurality of logical columns, wherein parity information is stored in one erase unit of each erase unit stripe, and data are stored in a plurality of remaining erase units of each erase unit stripe.

8. The apparatus of claim 1 wherein the erase units are arranged into a plurality of erase unit stripes, each of the erase unit stripes comprising an erase unit on a flash memory device for each of a plurality of logical columns, wherein parity information is stored in one erase unit of each erase unit stripe, and data are stored in a plurality of remaining erase units of each erase unit stripe, wherein data of a first erase unit within a first erase unit stripe are reconstructed through an exclusive OR operation on corresponding data in the remaining erase units of the first erase unit stripe.

9. The apparatus of claim 1 wherein the erase units are arranged into a plurality of erase unit stripes, each of the erase unit stripes comprising an erase unit on a flash memory device for each of a plurality of logical columns, wherein parity information is stored in one erase unit of each erase unit stripe, and data are stored in a plurality of remaining erase units of each erase unit stripe, wherein data of a first erase unit, which is busy via a write operation, within a first erase unit stripe is reconstructed and at least a portion thereof is provided in response to a read memory request, the data being reconstructed through an exclusive OR operation on corresponding data in the remaining erase units of the first erase unit stripe.

10. A computer program product, the computer program product comprising a non-transitory computer-readable storage medium and storing executable code that, when executed by at least one data processing apparatus, is configured to cause the at least one data processing apparatus to perform a method comprising:
  store, by a host device, a first translation map for converting a logical sector to a logical erase unit, logical column and a physical page;
  receive, by a memory controller of a data storage device, a second translation map from the host device, the second translation map for converting a logical erase unit and logical columns to a physical chip and a physical erase unit within the physical chip, wherein the data storage device includes a plurality of flash memory devices and the memory controller operationally coupled with the flash memory devices, each of the flash memory devices being arranged into a plurality of erase units, each of the erase units having a plurality of physical pages for storing data; and
  store, by the memory controller, the second translation map in a memory module on the data storage device.

11. The computer program product of claim 10 wherein the method performed by the at least one data processing apparatus further comprises:
  perform the following by the host device:
    receive a memory read command from an application running on the host device, the memory read command identifying a logical sector; and
    convert the logical sector to a corresponding logical erase unit and a physical page based on the first translation map;
  perform the following by the memory controller:
    receive, from the host device, the memory read command, and an identification of the logical erase unit and the physical page;
    convert the logical erase unit to a corresponding physical erase unit based on the second translation map;
    perform a memory read operation on the flash memory devices based on the memory read command, the physical erase unit and the physical page; and
    return data of the memory read operation to the host device.

12. The computer program product of claim 10 wherein the method performed by the at least one data processing apparatus further comprises:
  perform the following by the host device:
    receive a memory write command from an application running on the host device, the memory write command identifying a logical sector; and
    identify a free physical page of a new logical erase unit;
  perform the following by the memory controller:

receive, from the host device, the memory write command, and an identification of the free physical page and the new logical erase unit;

convert the logical erase unit to a corresponding physical erase unit based on the second translation map;

perform a memory write operation on the free physical page within the corresponding physical erase unit of the flash memory devices based on the memory write command; and return to the host device an acknowledgement of the write operation; and perform the following by the host device:

update, by the host device, the first translation map so that the received logical sector corresponds to the new logical erase unit and the free physical page.

13. The computer program product of claim 10 wherein the data storage device further includes a write buffer that is the same size as a physical page, wherein the method performed by the at least one data processing apparatus further comprises:

perform the following by the memory controller:

receive one or more write requests from the host device to write a plurality of logical sectors of data to the flash memory devices;

write the logical sectors to the write buffer; and write the data in the write buffer to a physical page corresponding to a free logical page when the write buffer becomes full.

14. The computer program product of claim 10 wherein the method performed by the at least one data processing apparatus further comprises:

perform the following by the memory controller:

copy one or more valid logical sectors from a logical erase unit selected for garbage collection to a new logical erase unit;

erase the erase unit selected for garbage collection; and update the first translation map to reflect that the one or more valid logical sectors are now stored in the new logical erase unit.

15. The computer program product of claim 10 wherein the erase units are arranged into a plurality of erase unit stripes, each of the erase unit stripes comprising an erase unit on a flash memory device for each of a plurality of logical columns, wherein parity information is stored in one erase unit of each erase unit stripe, and data are stored in a plurality of remaining erase units of each erase unit stripe, wherein the method performed by the at least one data processing apparatus further comprises:

perform the following by the memory controller:

reconstruct, by the memory controller, data of a first erase unit within a first erase unit stripe through an exclusive OR operation on corresponding data in the remaining erase units of the first erase unit stripe.

16. The computer program product of claim 10 wherein the erase units are arranged into a plurality of erase unit stripes, each of the erase unit stripes comprising an erase unit on a flash memory device for each of a plurality of logical columns, wherein parity information is stored in one erase unit of each erase unit stripe, and data are stored in a plurality of remaining erase units of each erase unit stripe, wherein the method performed by the at least one data processing apparatus further comprises:

perform the following by the memory controller:

receive a read request from the host device for data that includes at least a portion of a first erase unit that is part of a first erase unit stripe, the first erase unit stripe including a plurality of erase units including the first erase unit stored on a first flash memory device, with one of the erase units of the erase unit stripe storing parity information and other erase units of the erase unit stripe storing data;

determine that the first flash memory device is busy based on a write operation being performed on the first flash memory device;

reconstruct data of the first erase unit stored on the first flash memory device through an exclusive OR operation performed on corresponding data in remaining erase units of the first erase unit stripe; and provide the requested data to the host device including at least a portion of the reconstructed data.

17. A method performed by a system that includes a host device and a data storage device, the data storage device including a plurality of flash memory devices and a memory controller operationally coupled with the flash memory devices, each of the flash memory devices being arranged into a plurality of erase units, each of the erase units having a plurality of physical pages for storing data, the method comprising:

storing a first translation map for converting a logical sector to a logical erase unit, logical column and physical page;

receiving, by the memory controller, a second translation map from the host device, the second translation map for converting a logical erase unit and logical columns to a physical chip and a physical erase unit within the physical chip; and storing the second translation map in a memory module on the data storage device.

\* \* \* \* \*